(12) United States Patent
Auerbach et al.

(10) Patent No.: US 6,199,126 B1
(45) Date of Patent: *Mar. 6, 2001

(54) PROCESSOR TRANSPARENT ON-THE-FLY INSTRUCTION STREAM DECOMPRESSION

(75) Inventors: Daniel Jonathan Auerbach; Timothy Michael Kemp, both of San Jose, CA (US); Robert Kevin Montoye, Cold Spring, NY (US); John Davis Palmer, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,202

(22) Filed: Sep. 23, 1997

(51) Int. Cl.[7] .................................................... G06F 12/02
(52) U.S. Cl. .............................................................. 710/68
(58) Field of Search ............................... 710/68; 709/231; 713/201; 708/203; 711/111, 202

(56) References Cited

U.S. PATENT DOCUMENTS

| | | | | |
|---|---|---|---|---|
| 5,155,484 | * | 10/1992 | Chambers, IV | 341/55 |
| 5,357,614 | * | 10/1994 | Pattisam et al. | 395/250 |
| 5,410,671 | * | 4/1995 | Elgamal et al. | 395/425 |
| 5,463,772 | * | 10/1995 | Thompson et al. | 395/600 |
| 5,490,247 | * | 2/1996 | Tung et al. | 395/162 |
| 5,506,954 | * | 4/1996 | Arshi et al. | 395/162 |
| 5,524,110 | * | 6/1996 | Danneels et al. | 370/62 |
| 5,537,551 | * | 7/1996 | Denenberg et al. | 395/200.18 |
| 5,574,953 | * | 11/1996 | Rust et al. | 710/68 |
| 5,630,092 | * | 5/1997 | Carreiro et al. | 710/68 |
| 5,758,085 | * | 5/1998 | Kouoheris et al. | 709/231 |
| 5,761,485 | * | 7/1998 | Munyan | 713/201 |

* cited by examiner

Primary Examiner—Thomas C. Lee
Assistant Examiner—Omar A. Omar
(74) Attorney, Agent, or Firm—Morgan & Finnegan, LLP

(57) ABSTRACT

An apparatus and method for transparent on-the-fly decompression of the program instruction stream of a processor. Connected between a processor and a memory storing compressed information is a decompression device. The decompression device, receives a request from the processor for information, retrieves compressed information from the memory, decompresses the retrieved compressed information to form uncompressed information, and transmits the uncompressed information to the processor. The compressed information may include both program instructions and data. When the decompression device receives a request for information, which includes an unmodified address, from the processor, it generates an index offset from the received unmodified address. An indexed address corresponding to the generated index offset is retrieved from an index table. Compressed information corresponding to the selected indexed address is retrieved from the memory and transmitted to the processor.

5 Claims, 19 Drawing Sheets

PROCESSOR TRANSPARENT ON-THE-FLY INSTRUCTION STREAM DECOMPRESSION

FIELD OF THE INVENTION

The present invention relates to a circuit and method for transparent on-the-fly decompression of the program instruction stream of a processor.

BACKGROUND OF THE INVENTION

With computer processors getting smaller and cheaper, and computer programs getting larger and more complex, the size and cost of a computer's memory for storing program information has become a significant portion of the cost of a computer solution. While memory cost is important in general purpose computer systems, such as personal computers, it becomes critical in embedded special-purpose computer devices, especially those used in low-cost products. Significant cost reductions in computer-based products may be realized by reducing the memory required by a particular program. One possible technique involves compressing the program instructions in memory.

In order to use compressed programs, program instructions within the memory may be grouped into blocks and each block compressed by techniques well known in the art. For example, see "Elements of Information Theory, T. Cover & T. Thomas, Wiley & Sons, New York (1991). In the prior art, whenever processor 102, shown in FIG. 1, wishes to execute the instructions in a particular block, other program instructions are executed that read the block from memory, decompress it and temporarily store it while the instructions are executed.

This solution has several problems. It involves a serious performance penalty. Furthermore, it requires modifications to be made to the computer system. In particular, the tools used to program the processor, such as, compilers, linkers, editors and debuggers, must be modified. The problem with this is the high cost of recreating the tools for the new computer software structure. A need arises for a technique that allows a computer program to occupy less space, while allowing the changes to the program to be transparent to the computer and its supporting tools.

SUMMARY OF THE INVENTION

The present invention is an apparatus and method for transparent on-the-fly decompression of the program instruction stream of a processor. It allows a computer program to occupy less space, while allowing the changes which were made to the program to be transparent to the computer and its supporting tools.

Connected between a processor and a memory storing compressed information is a decompression device. The decompression device, receives a request from the processor for information, retrieves compressed information from the memory, decompresses the retrieved compressed information to form uncompressed information, and transmits the uncompressed information to the processor. The compressed information may include both program instructions and data.

When the decompression device receives a request for information, which includes an unmodified address, from the processor, it generates an index offset from the received unmodified address. An indexed address corresponding to the generated index offset is retrieved from an index table. Compressed information corresponding to the selected indexed address is retrieved from the memory and transmitted to the decompression device, where it is decompressed and set to the processor. Thus, the entire decompression operation is transparent to the processor.

BRIEF DESCRIPTION OF THE DRAWINGS

The details of the present invention, both as to its structure and operation, can best be understood by referring to the accompanying drawings, in which like reference numbers and refer to like elements.

FIG. 6b is a block diagram of exemplary data corresponding to several steps of process, shown in FIG. 6a.

DETAILED DESCRIPTION OF THE INVENTION

1.0 Introduction

Figure 1:
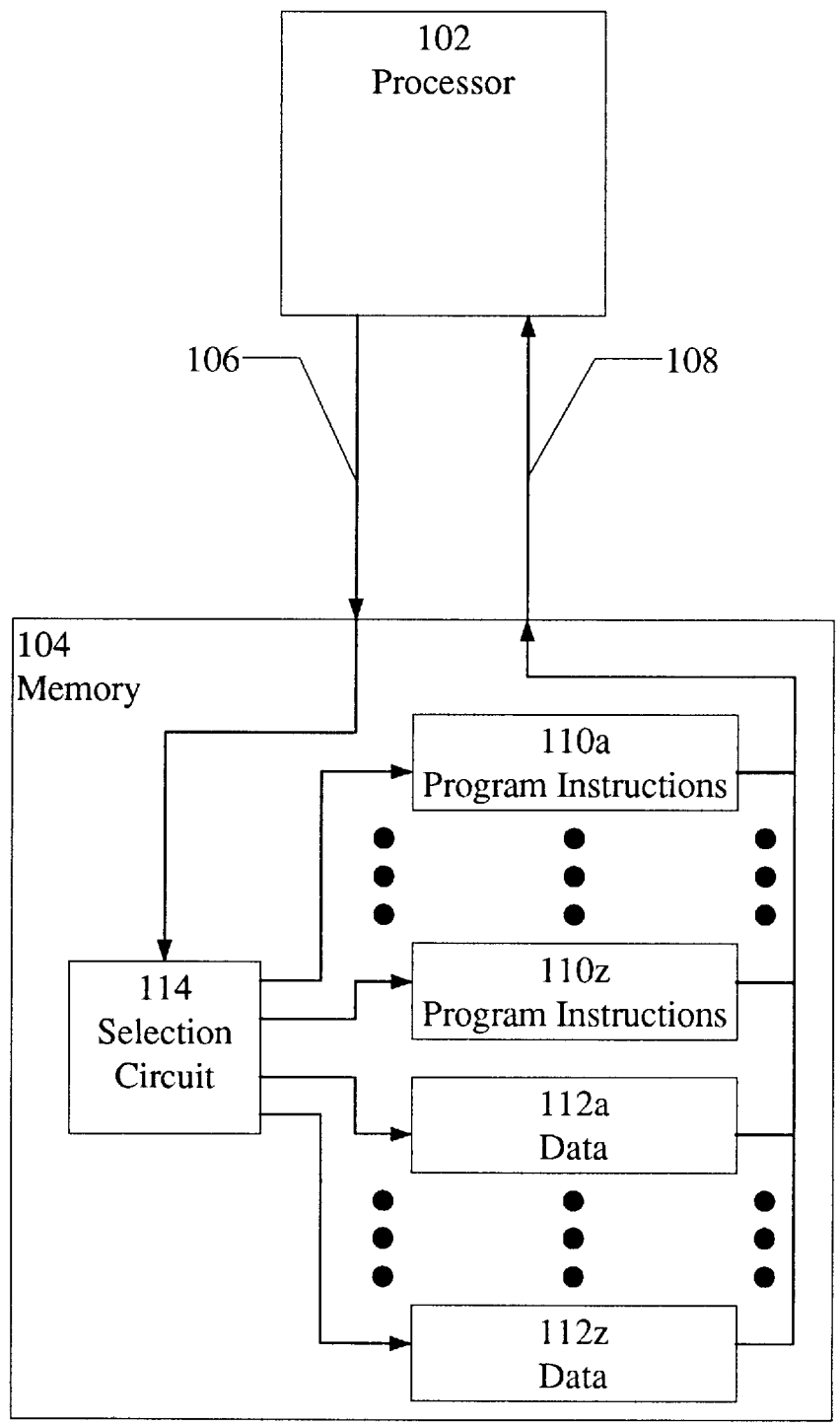
FIG. 1 is a block diagram of a prior art computer system.

FIG. 1 is a block diagram of a prior art computer system. Memory 104 stores information used by processor 102. In general, there are two types of information stored in memory 104. One type of information is program instructions 110a–z, which control the processing performed by processor 102. The other type of information is data 112a–z, which is information which is processed by processor 102. The program instructions 110a–z and data 112a–z are stored in memory 108 in the format required by processor 102. The information stored in memory 104 is stored in individually accessible locations, each of which has a corresponding address which identifies the location. In order to access the information stored in a particular location, processor 102 presents the address of the memory location to be accessed to memory 104 over address lines 106. The address is input to selection circuit 114, which decodes the address and selects the corresponding memory location. The information stored in the selected location is output to processor 102 over data lines 108.

Figure 2:
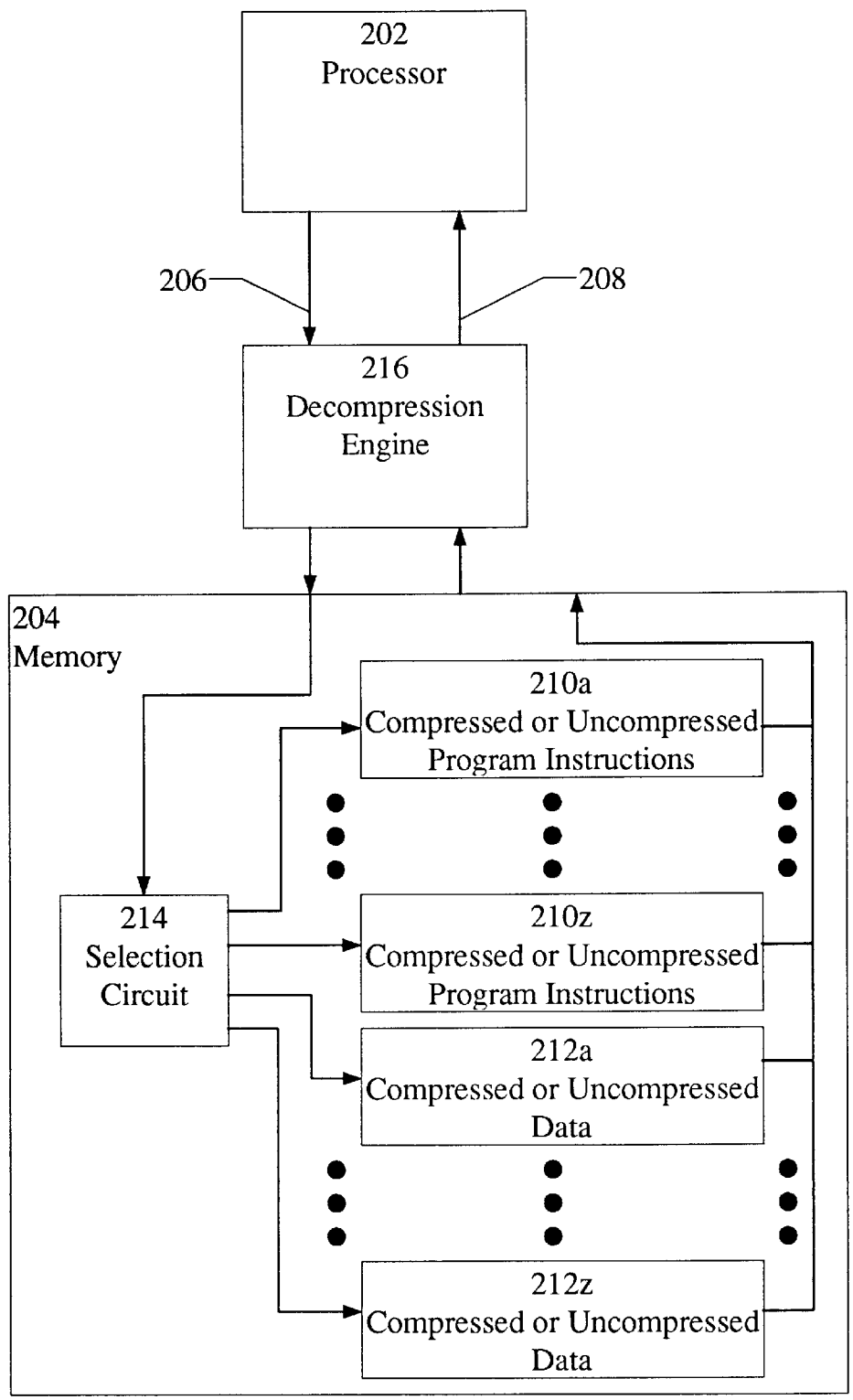
FIG. 2 is a block diagram of a computer system, according to the present invention.

A computer system, in accordance with the present invention, is shown in FIG. 2. Memory 204 stores the information used by processor 202. This information includes program instructions 210a–z and data 212a–z. Instructions may also be stored in uncompressed format, in which case they are used without modification by processor 202. The program instructions are stored in memory 204 in a compressed format 210a–z. The instructions stored in the compressed format cannot be directly used by processor 202, but must be converted to the required uncompressed format by a process known as decompression. The advantage of storing the program instructions in a compressed format is that they occupy less space in memory. This allows a given program to be stored in a smaller memory, thus reducing the cost of the computer system. Data 212a–z may be stored in an uncompressed format, in which case it is used directly by processor 202. Data 212a–z may also be stored in a compressed format, in which case it must be decompressed before use. For simplicity, the following discussion, which describes the decompression of compressed information, refers only to program instructions and program code. However, the described processes and apparatuses are similarly applicable to the decompression of compressed data.

One advantage of the present invention is that the decompression process is transparent to processor 202. Processor 202 need know nothing about the compressed program instructions. Processor 202 requests uncompressed instructions by presenting addresses on address lines 206 and receives uncompressed instructions on data lines 208. Decompression engine 216 performs the decompression process independently of processor 202. Decompression engine 216 takes the address supplied by processor 202, accesses the appropriate memory location in memory 204, receives the compressed program instruction from memory 204, applies its decompression function to the compressed program instruction and supplies the uncompressed program instruction to processor 202 over data lines 208. The compression/decompression scheme is transparent to the processor.

Figure 3:
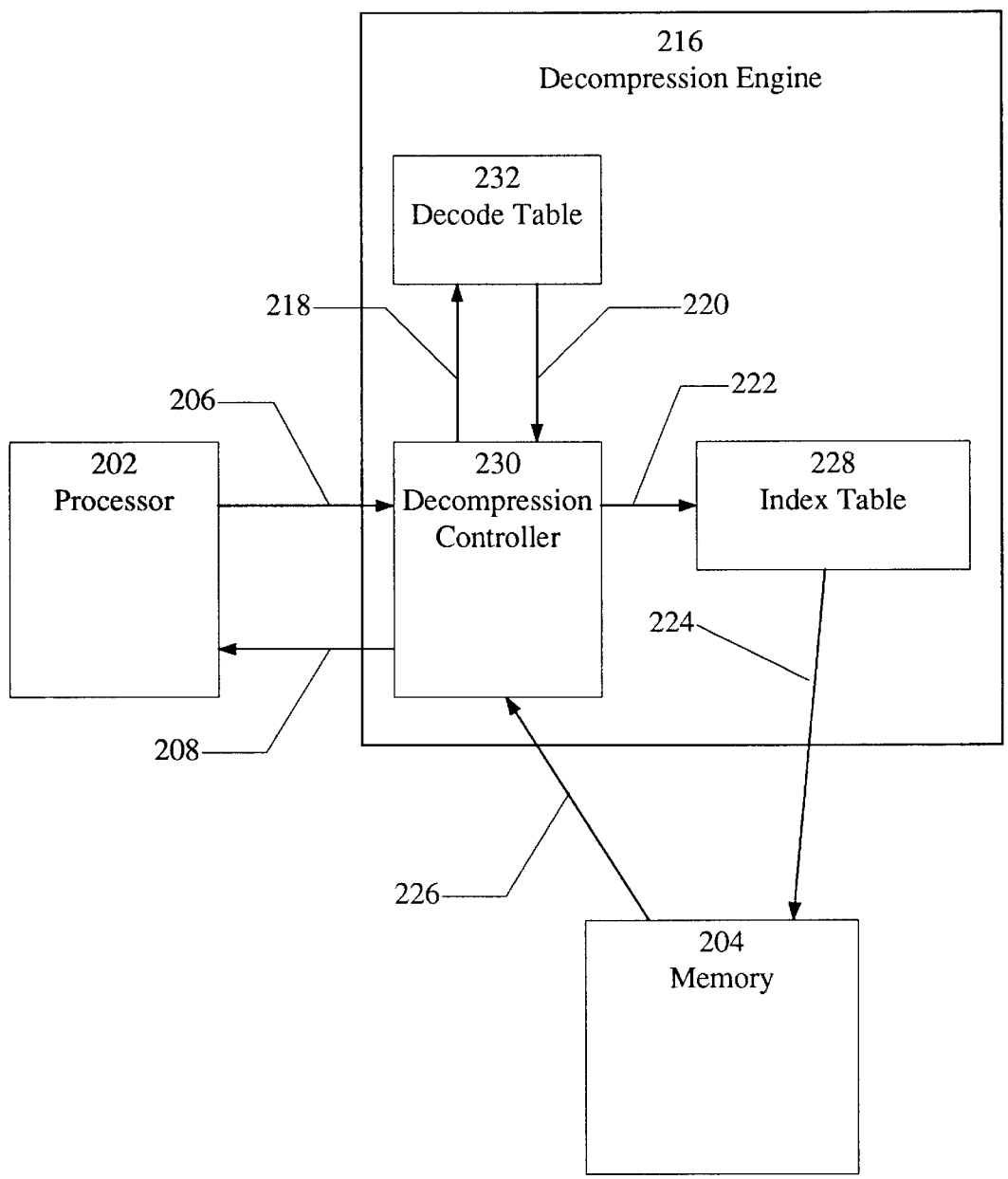
FIG. 3 is a block diagram of a computer system, according to the present invention.
Figure 4:
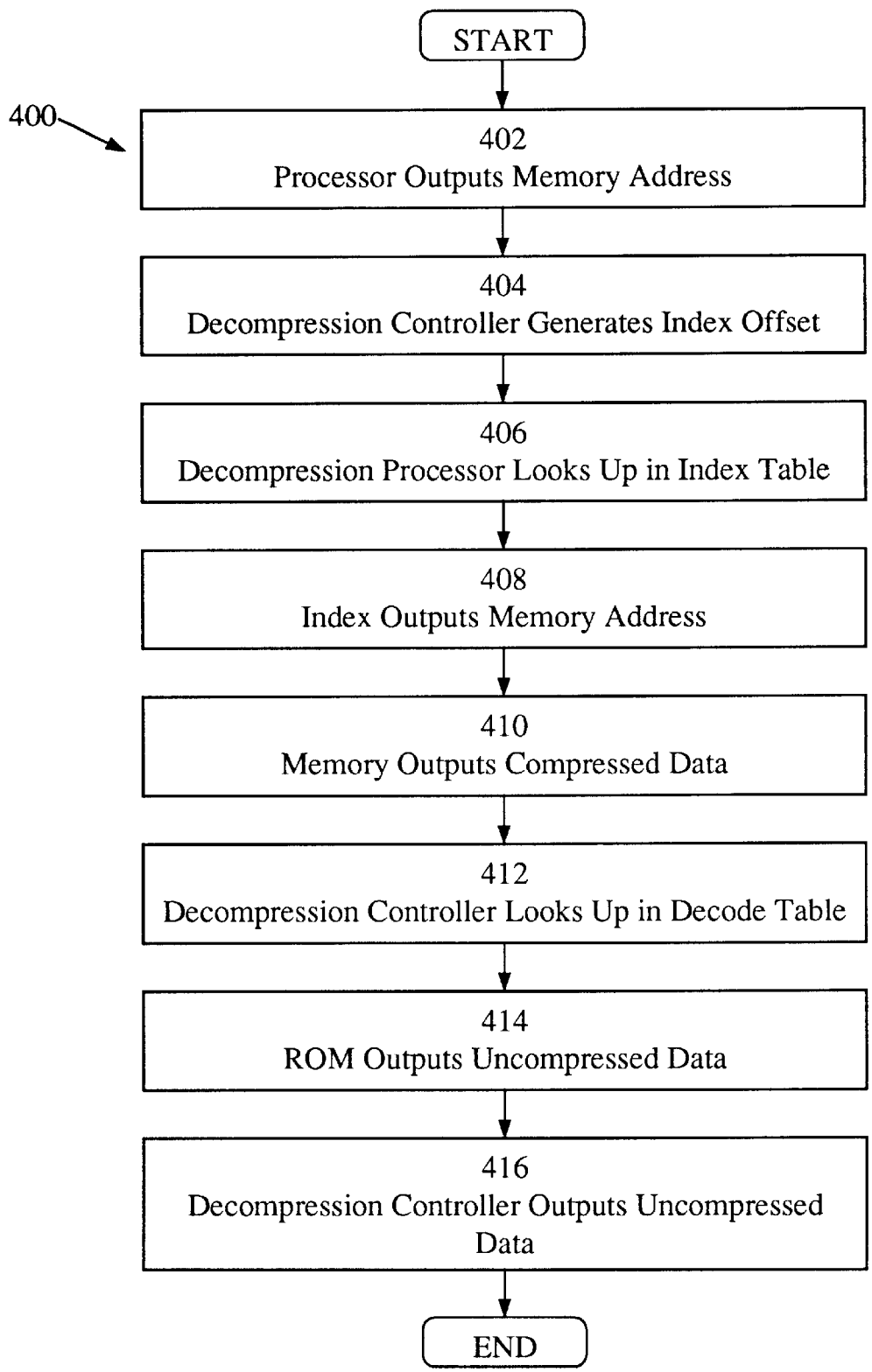
FIG. 4 is a flow diagram of a decompression process, implemented in the computer system of FIG. 3.

The computer system of FIG. 2 is shown in more detail in FIG. 3. Decompression engine 216 includes decompression controller 230, index table 228 and decompression table 232. Although, for clarity, index table 228 is shown inside decompression engine 216, index table 228 would typically be stored in memory 204. However, index table 228 could also be stored in circuitry within decompression controller 216. The operation of the computer system is most easily understood by referring to FIG. 4, a flow diagram of the decompression process 400 of the present invention, in conjunction with FIG. 3. Process 400 starts with step 402, in which processor 202 outputs the address of the desired memory location to decompression engine 216 on address lines 206. Address lines 206 are input to decompression controller 230. In step 404, decompression controller 230 generates an offset into index table 228. In step 406, decompression controller 230 outputs the offset to index table 228 on index input lines 222. The location in index table 228 indicated by the offset is accessed. Index table 228 is a lookup table containing addresses of compressed instructions or blocks of instructions stored in memory 204. Thus, the accessed location contains a memory address, which, in step 408, is output to memory 204 on memory address lines 224.

Memory 204 accesses the location indicated by the memory address. Memory 204 contains compressed program instructions 210a–z and data 212a–z. In step 410, memory 204 outputs the compressed program instructions contained by the accessed location to decompression controller 230 on compressed data lines 226. In step 412, decompression controller 230 outputs the compressed program instructions to decode table 232 on lines 218. Decode table 232 is a lookup table which transforms compressed program instructions into uncompressed program instructions. Information in each compressed program instruction is used to address a location in the decode table which contains the corresponding uncompressed program instruction. In step 414, decode table 232 outputs the uncompressed program instructions to decompression controller 230. In step 416, decompression controller 230 outputs the uncompressed program instructions to processor 202 over data lines 208.

It is seen that the present invention provides transparent decompression of compressed program instructions. Processor 202 outputs conventional address information on its standard address lines and receives conventional program instructions on its standard data lines. The decompression process is performed transparently to the processor.

Figure 5A:
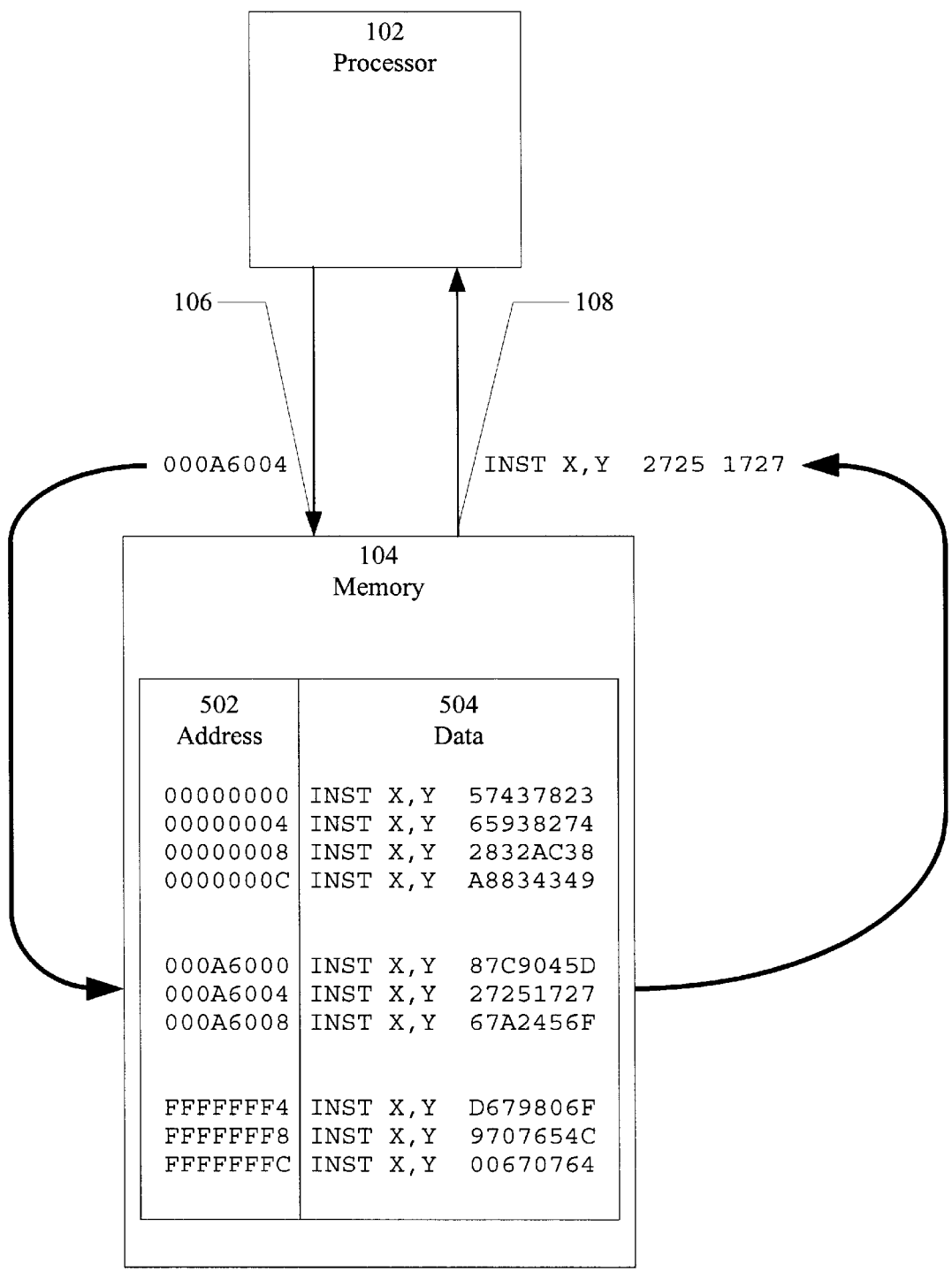
FIG. 5a is a block diagram of a prior art computer system, showing the layout of instructions in memory.

An exemplary memory access in a prior art computer system is shown in FIG. 5a. Processor 102 outputs an address on address lines 106. Many current processors, such as the PowerPC, 68040, 80486, etc., use addresses which are 32 bits in length, for example "000A6004". A processor with 32 bit addresses is capable of accessing up to 4 gigabytes of memory, which is much greater than is required in a typical application. Instead, the various addressed devices are usually distributed throughout the address space at addresses that are convenient to implement. For example, read only memory may be located starting at address "00000000", input/output (I/O) devices at address "40000000" and random access memory at address "80000000". Although there are large gaps of unused addresses between the addresses which are used, the unused addresses are not needed because the total amount of memory and I/O devices requires only a small portion of the address space.

Memory 104 accesses its internal location corresponding to address "000A6004" and outputs the data stored by that location. Here, the data is the program instruction "INST X,Y" which has the bit pattern "27251727". The stored data is output from the memory on data lines 108 and input to processor 102 for execution.

Figure 5B:
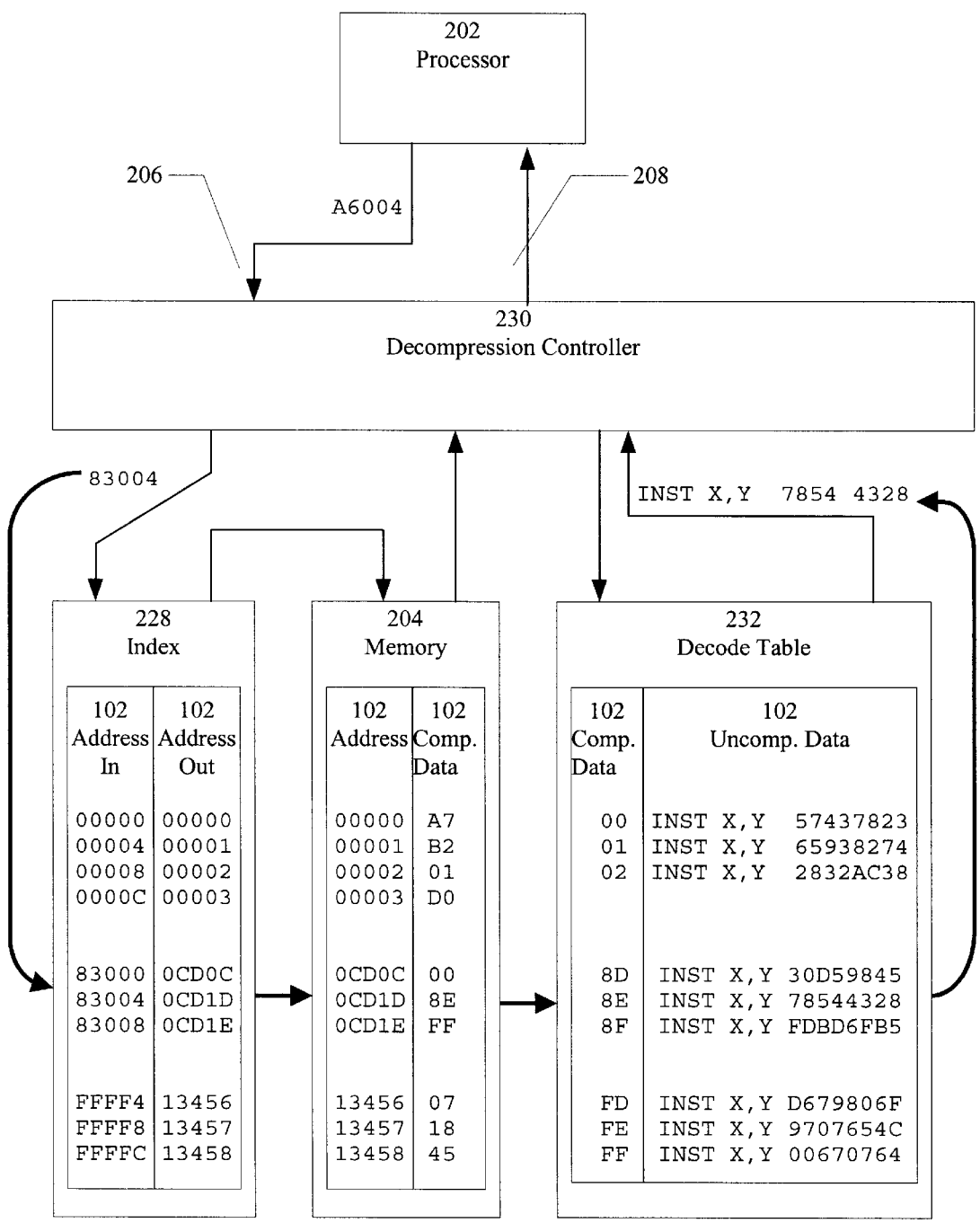
FIG. 5b is a block diagram of a computer system, according to the present invention, showing the layout of index and compressed instructions in memory.

An exemplary memory access in the computer system of the present invention is shown in FIG. 5b. As in a conventional system, processor 202 outputs an address, for example "000A6004", on address lines 206. However, in the present invention, the output address is input to decompression controller 230. Decompression controller generates an index offset from the address, for example "83004", and outputs the offset to index table 228. As was previously discussed, the address space of a typical computer system contains large gaps of unused addresses. Index table 104 contains an entry for each address which is used, or an entry pointing to the start of a block of addresses, termed a compression block. There are no entries for any of the unused addresses. Each entry contains an address in memory 204 of a compressed program instruction. The index entry corresponding to the input index offset is accessed and the memory address, for example "0CD1D", contained therein is output to memory 204.

Memory 204 accesses the location corresponding to the input address and obtains the compressed program instruction, for example "8E" contained therein. The compressed program instruction is output to decompression controller 230, which outputs the compressed program instruction to decode table 232. Decode table 232 accesses the location corresponding to the input compressed program instruction or compression block and obtains the uncompressed program instruction, for example "INST X,Y", which has a hex representation of "78544328", contained therein. The uncompressed program instruction is output to decompression controller 230, which outputs the uncompressed program instruction to processor 202 on lines 208. In the case of a compression block, the decompression engine starts decompressing at the beginning of the block and may translate the entire block. A cache memory system in the processor may be used to hold the block of uncompressed instructions.

1.1 Compression

Decompression is executed on the fly in hardware whenever the CPU fetches an instruction located in compressed code address space. Compression of those instructions is done only once after the code has been compiled and before being stored in memory. The software which compresses the compiled image analyzes the instruction stream finds the set of most often used instructions and builds decode tables from those instructions.

Figure 6A:
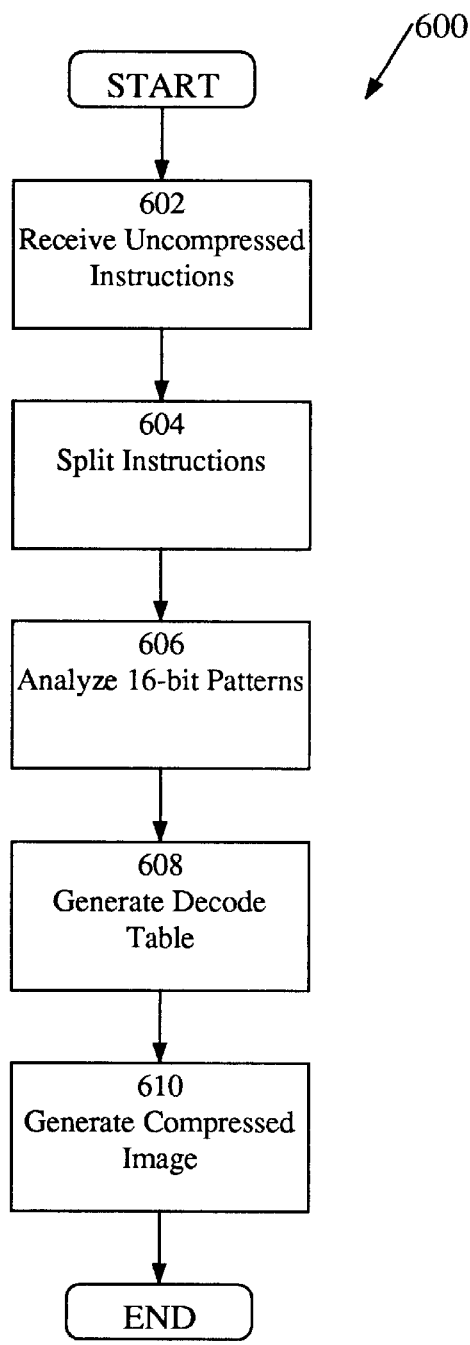
FIG. 6a is a flow diagram of a compression process, according to the present invention.
Figure 6B:
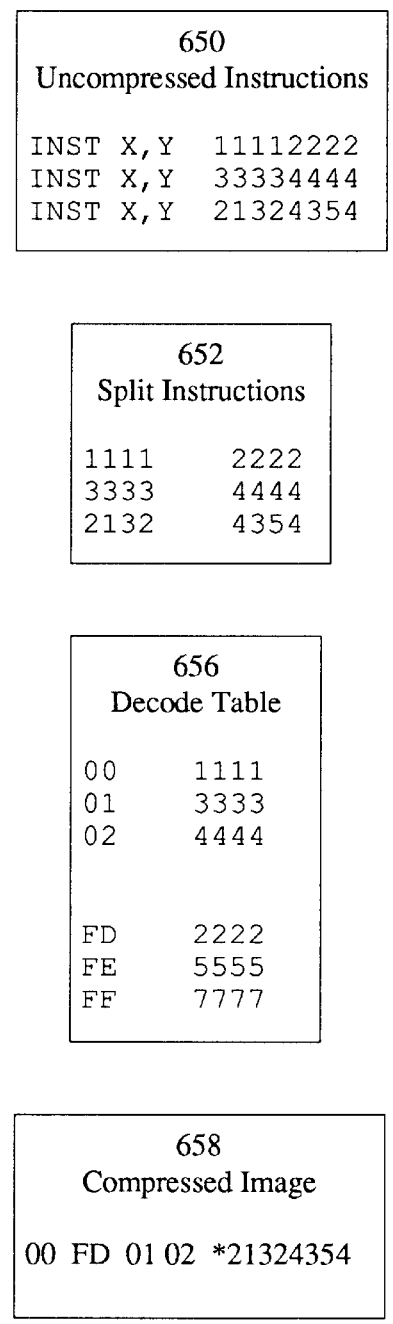

FIG. 6a is a flow diagram of a compression process 600. It is best viewed in conjunction with FIG. 6b, which is a block diagram of exemplary data corresponding to several steps of process 600. The process begins with step 602, in which uncompressed 32-bit instructions 650 are received. For example, instructions with bit patterns (in hex) of "11112222", "33334444" and "21324354" are received. In step 604, each instruction is split in half into upper and lower 16-bit portions, as in block 652. For example, the received instructions are split into the bit patterns "1111", "2222", "3333", "4444", "2132" and "4354". In step 606, the upper and lower 16-bit portions are separately analyzed to determine the most common 16-bit patterns. In step 608, a decode table 656 is generated, which comprises 256 or 512 entries storing the most common 16-bit patterns. For example, entry "00" of decode table 656 stores the 16-bit pattern "1111". Likewise, entry "01" stores pattern "3333", entry "02" stores "4444", entry "FD" stores "2222", entry "FE" stores "5555" and entry "FF" stores "7777". In step 610, a compressed data stream 658 is generated. Each 16-bit pattern in uncompressed data stream 650 is looked up in decode table 656. For each 16-bit pattern which is found in decode table 656, the number of the entry corresponding to that 16-bit pattern is substituted for the 16-bit pattern. Any 16-bit patterns which are not found in the decode table are tagged as not compressed and the entire 16-bit value is stored in the compressed image 658.

Once the compression program has determined the best combination of codes to put in the table it generates the table with those 16-bit patterns. If the decompression unit contains decode tables implemented with random access memory (RAM), the generated decode tables are loaded into the decompression unit before attempting to access compressed instruction streams. Units may also be built using read only memory (ROM), in which case the decode table is fixed in hardware and the compression program will need to compress using the pre-defined look up table.

After determining which 16-bit patterns made it into the decode table the patterns are compressed using a scheme employing a tag and an index which is used by the decompression unit to generate an address into the decode table to select the original 16-bit pattern.

Compression software compresses chunks of program code in fixed-size blocks, known as a compression block, and the resulting compressed block of code will vary in size. The actual range of sizes will depend on the encoding scheme selected. Because of the varying compressed block length, the compression software must also generate an index table which translates addresses of uncompressed blocks, known as target instruction addresses, to addresses of compressed variable length blocks. The index table will also contain information indicating on a per block basis whether that compression block has been compressed or left uncompressed. This index is loaded into system memory along with the program code. The decompressor will access the index table whenever a fetch is made to compressed program space.

2.0 Preferred Embodiment 2.1 Overview

In a preferred embodiment, a PowerPC processor is used. The PowerPC instruction set requires a relatively large amount of memory for the instructions which perform a given task. This is because the PowerPC architecture is a RISC architecture and uses a 32-bit, fixed length instruction set. This results in a requirement for a larger amount of memory (ROM, Flash, or DRAM) for instruction storage than a processor which uses either smaller fixed length or variable length instructions.

Figure 7:
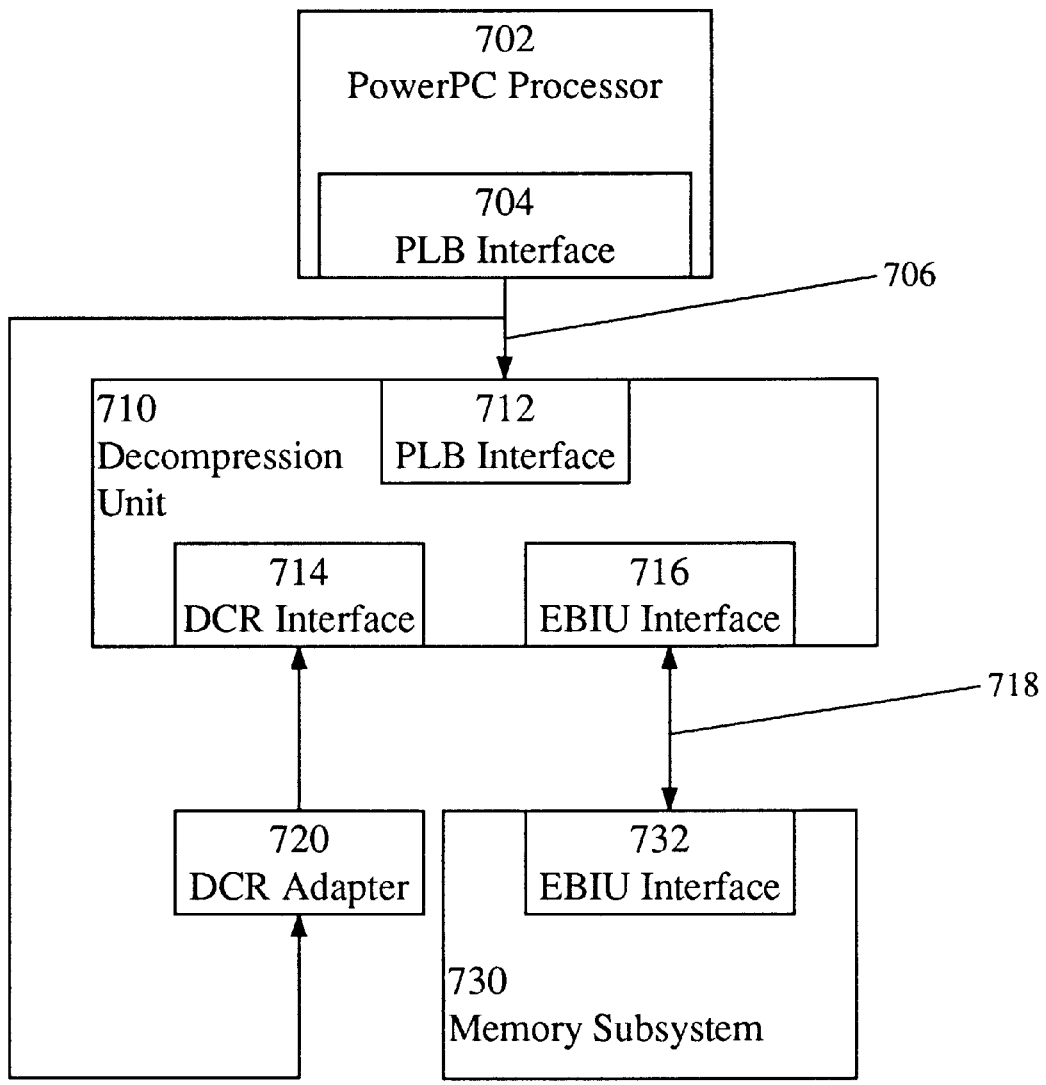
FIG. 7 is a block diagram of a preferred embodiment of the present invention.

FIG. 7 is a block diagram of a preferred embodiment of the present invention, in which a PowerPC processor 702 is used. Processor 702 includes a processor local bus (PLB) interface 704, which adapts processor 702 to processor local bus 706. Processor local bus 706 is connected to PLB interface 712 of decompression unit 710 includes. Decompression unit 710 includes external bus interface unit (EBIU) interface 716, which connects to external bus 718. External bus 718 connects to EBIU interface 732 of memory subsystem 730. Decompression unit 710 also includes device control register (DCR) interface 714, which connects to DCR adapter 720, which adapts processor local bus 706 to control the DCR interface.

Requests for input are output from processor 702 over PLB 706, which includes address lines, data lines and control lines. If the input request is for compressed program instructions, decompression unit 710 performs the decompression process described above. If the input request is for any other type of information, such as uncompressed program instructions or data, the input request is passed through to memory subsystem 730 and handled conventionally. DCR interface 714 allows processor 702 to access the registers and memory elements internal to decompression unit 710.

2.2 Decompression Unit

The decompression unit is located between the CPU unit and the EBIU. It isolates the EBIU from the internal PLB and is transparent to both the CPU and the EBIU. The CPU side of the decompression unit is a PLB slave to the PLB bus while the EBIU side acts a PLB master to the EBIU. All requests for external memory go though the decompression unit and are either intercepted for decompression or allowed to pass through unaltered.

2.2.1 Operation of the Decompression Unit

The decompression unit must be able to distinguish between compressed and uncompressed code space. This may be done on the basis of address ranges. The CPU unit may provide a signal with each instruction memory reference indicating whether that reference is in compressed or uncompressed memory space. This signal, which is known as the "K" bit, is not required, since the present invention can be transparently attached to existing processors, which do not possess the "K" bit. In the absence of the "K" bit, compressed information may be indicated by specified address ranges or by a memory control unit. Alternatively, the function of the "K" bit may be hardwired such that all instruction fetches will have the "K" bit active.

In the case where the reference is to uncompressed space (K=0) the decompressor will not intercept the memory cycle and will pass it on unaltered to the EBIU which will perform the memory cycle. The decompressor will also provide the unaltered data back to the CPU in the case of a read. This transaction shall not incur any additional latency cycles due to the decompression unit.

A conventional PowerPC processor may be modified to add the "K" bit. The "K" bit may be implemented in the CPU unit's TLB entries and in the real mode storage attribute register (SKR) so that each page may be marked as compressed or not.

Instruction fetches which address code in compressed memory space (K=1) are intercepted by the decompression unit which will locate the compressed code in memory and decompress the instruction stream before forwarding it on to the CPU. The decompressor unit will go through the following steps to provide decompressed instructions back to the CPU when compressed code is referenced.

1. Locate Compressed Code
    a. Calculate offset into index table
    b. Retrieve index from index table
    c. Calculate address of compressed instruction block using the index table entry
    d. Retrieve instruction block
2. Decode instructions into output buffer if required
3. Return instructions to CPU The decompression unit will contain a 64-bytewide output buffer which is used to store the instruction words as they are decompressed. Since code is compressed and decompressed in 64-byte blocks and the CPU requests line fills which are less than 64 bytes (16 bytes for PowerPC model 401 CPU) some accesses to instructions in compressed memory may already be available in the decompressor output buffer decompressed and ready to be sent back to the CPU. In this case, line fill requests may be serviced immediately from the output buffer without having to address external memory.

Step 2 above indicates that compressed code is decoded "if required." There are cases where some 64-byte blocks will not be compressed even though they reside in compressed code space. This is because it is possible that some instruction streams may "compress" into a block that is actually larger than the original block. In that case it is more beneficial to not compress the block of instructions at all and mark it as uncompressed so the decoder will not attempt to decompress that individual block.

2.2.2 Performance Considerations

The design goal of the decompression unit is that read/write requests to uncompressed memory spaces will incur no additional latency over a system without a decompression unit. The decompression unit will add additional latency to some read accesses to compressed memory space. Additional cycles are required in order for the decompression unit to find the location of compressed code space and to decode the instructions and place them in the output buffer to return to the CPU. However, since instructions are encoded in 64-byte compression blocks, the decompressor will continue to decode instructions until its 64-byte output buffer is full. Subsequent fetches to instructions that are within the same 64-byte block as the one currently in the output buffer will actually incur less latency than if there were no decompression unit in the system. In this case the decompression unit acts as a prefetch buffer for the CPU.

The worst latencies will occur when the CPU executes a jump out of the current 64-byte block. If the jump is to a location which is not at the beginning of a 64-byte block, the decompressor must begin fetching and decoding serially until it reaches the desired instructions and can return them to the CPU. In practice, the use of an effective caching scheme can mitigate the effects of latency.

2.3 Indexed Addressing

Program instructions are compressed in compression blocks of 64 bytes and stored in memory for the processor to fetch and execute. Since these 64-byte blocks are compressed they typically take up less than 64 bytes in the compressed memory image. Further each 64-byte block will compress into a variable length block of compressed code. The CPU however does not know that the program image is compressed and will request a block of data using the normal uncompressed image addresses (target instruction address). Therefore, when the CPU requests instructions from memory the decompressor must first determine how the uncompressed address space is mapped into the compressed address space.

Figure 8:
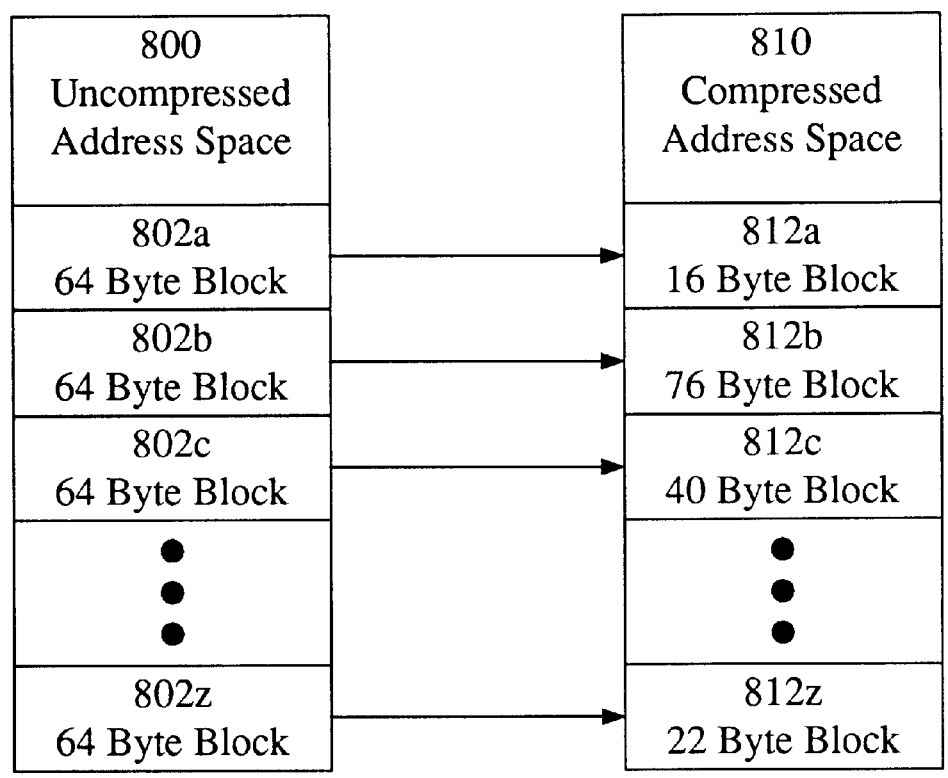
FIG. 8 is a block diagram of mapping of uncompressed address space to compressed address space.

FIG. 8 illustrates how uncompressed address space 800 is mapped into variable length blocks 812a–z in compressed address space 810. Uncompressed address space 800 is divided into a plurality of 64 byte blocks 802a–z. Each 64 byte block is compressed to form a compressed block 812a–z of varying length. The length of each block is dependent upon the compression. For example, 64 byte block 802a is shown mapping to 16 byte block 812a, while 64 byte block 802b maps to 76 byte block 812b. It is seen that some compressed blocks may be larger than the uncompressed block from which they were formed, but overall, compression reduces the memory used.

The address mapping is accomplished through an index table which the compression software generates when it creates the compressed code image. When the CPU fetches code from memory it may generate a bit known as the "K" bit that indicates whether the instruction fetch is within a compression region or not. Alternatively, the decompressor may determine if the fetch is from a compressed region based on register contents or conventions. Compression regions are 64 MB blocks of compressed code address space in main memory. If the access is to a compression region the decompressor must locate the code in that region by using an index table. Since the index table is located in memory, the decompressor must locate the starting address of the index table and add an offset to address the proper entry in the table corresponding to the target instruction address.

The decompression unit contains a set of registers known as the "Index Table Origin Registers" which locate the compression region as well as the starting address of the Index table within that compression region. There is an Index Table Origin Register programmed for each compression region (up to 4 simultaneously in the first implementation). The decompressor computes the address of the index table entry from the PLB address together with the contents of the Index Table Origin Register and executes a memory read to the EBIU to get a copy of the index table entry. After retrieving the index table entry the decompressor calculates the starting address of the compression block within the compression region and executes a burst cycle from the EBIU to begin filling it's buffers with the compressed data.

2.3.1 Index Table Format

Figure 9:
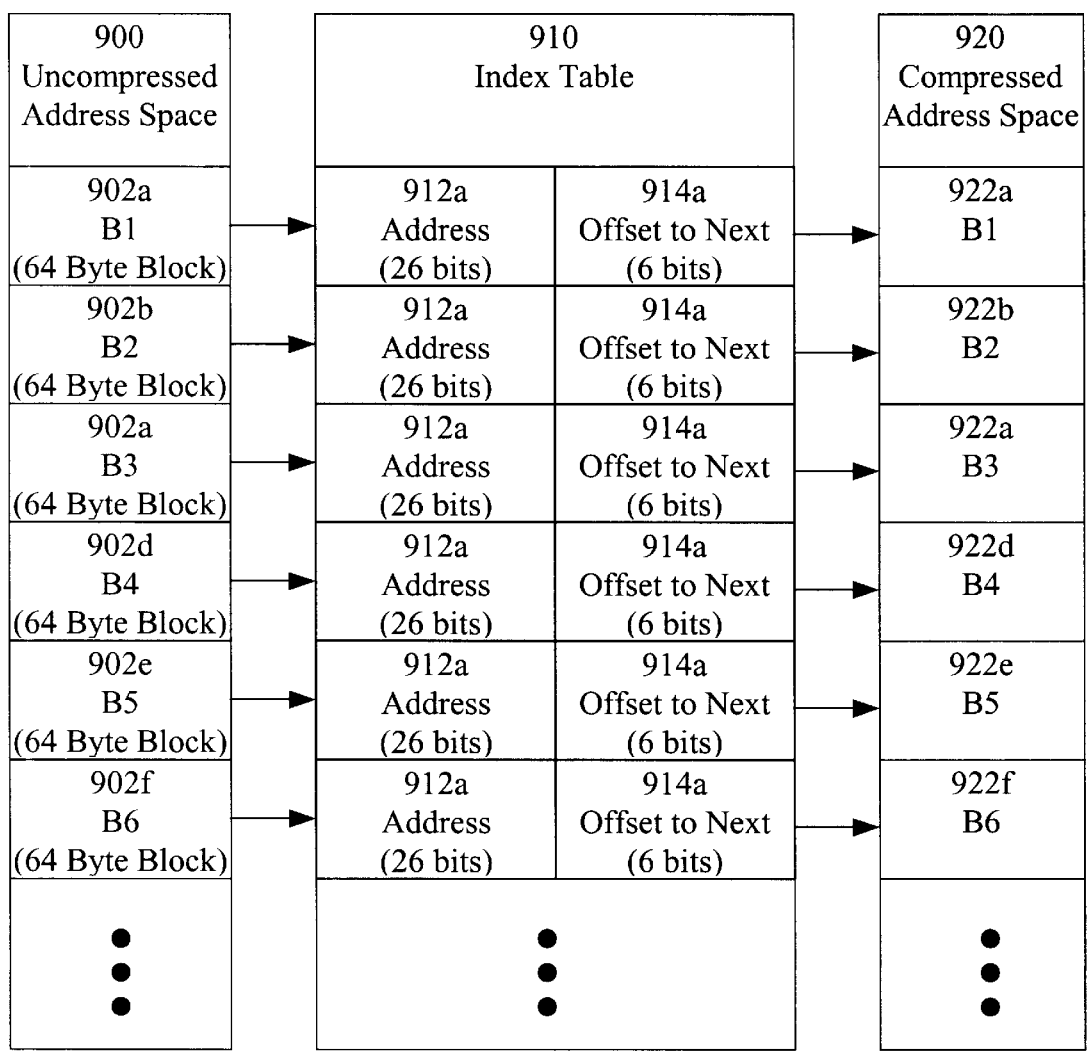
FIG. 9 is an exemplary format of an index table 910.

The index table is a list of 32-bit wide entries with each entry indicating the address of two sequential blocks (a compression group) of variable length compressed instruction streams. The format of each entry is shown in FIG. 9.

Each entry in index table 910 comprises of a 26-bit address field 912 and a 6-bit offset field 914. The 26-bit address field 912 indicates the address within the current compression region the first of the two compression blocks is located. The 6-bit offset field 914 is an offset from that address to the next compression block. This format allows 128 bytes of uncompressed code to be located using only 4 bytes of space in the index table. The 6-bit offset field 914 uses a format that not only locates the second block of code but it is also used to indicate whether those compression blocks have actually been compressed or not, as shown in TABLE 1.

TABLE 1

Index Offset Format

| 1st Block | 2nd Block | 6-bit Offset Value | Description |
|---|---|---|---|
| Not Compressed | Not Compressed | 0 | Both are 64-byte uncompressed blocks |
| Not Compressed | Compressed | 1 | Only the 2nd Block is compressed |
| Compressed | Compressed | >1 | Both blocks are compressed |
| Compressed | Not Compressed | Illegal Case | Cannot represent address of 2nd block |

As shown in TABLE 1, there are three allowed possible scenarios for the value of the 6-bit offset. A value of 0 indicates that neither of the blocks are compressed so the address of block 2 will always be 64 bytes past the address of the first block. If the index is 1 the address of block 2 is calculated the same as in the first case but the decompressor must treat the second block as compressed code. The third allowed case is when the offset is greater than 1 in which case both blocks are considered to be compressed and the 6-bit offset must be added to the 26-bit address field to locate the second block.

The first 64-byte block must never be allowed to "compress" to a block larger than 64 bytes since the 6-bit offset cannot point past 63 bytes. If the block becomes larger than 63 bytes then it should not be compressed.

The case in which the first block is compressed and the second block is uncompressed cannot be represented because if the first block is compressed, the entire 6-bit field is required to indicate the length of the first compressed block (up to 63 bytes). Using all 6 bits for length information does not allow any way to indicate whether the second block is compressed or not. Because of this only one case may be allowed and it was chosen to require the second block to be compressed as well which should yield the best overall compression. If the compression software came across this "illegal" case it would have to make a tradeoff to pick one of the other combinations.

2.4 Decoding Compressed Instructions

A decoder is responsible for accepting the data from the burst transfers from the EBIU and decompressing the instructions if required. A signal is presented to the decoder to indicate whether specific blocks need decompressing or not according to the offset encoded in the index table as shown in TABLE 1. If the offset indicates that the block is uncompressed, the decoder will pass the data directly through to the output buffers unaltered. If the block is compressed the decoder will decode the instructions before writing them into the output buffer.

2.4.1 Instruction Decode

Each PowerPC instruction is contained in a 32-bit word. The encoding scheme employed encodes the instructions in 2 16-bit pieces, the upper and lower halves of the instruction code. The most frequently used 16-bit patterns are placed in a Decode Lookup Table inside the decompression unit for decoding. The table is divided into "buckets" so that the 16-bit patterns which are encountered most frequently may be encoded with the fewest number of bits. Instruction used less frequently will require more bits to represent them in memory.

The encoded instructions are actually used as an address into this decode lookup table which provides the decode for each half of the instruction. The table could be implemented in either ROM or RAM. The encoding for each 16-bit pattern is broken into two pieces, a 2 or 3-bit Tag (TX) and a 0 to 8-bit ROM Index (RX). In the case where the 16-bit pattern was not placed in the table, the pattern is represented by a 3-bit Tag and the original 16-bit pattern or "Literal." Each Tag will represent a different number of 16-bit patterns which leads to a partitioning or "bucketing" of the index table. The encoding may be different for the high 16 bits and the low 16 bits of the instructions to improve compression. In this case, two tables are required to decode a full PowerPC instruction.

TABLE 2 below shows an exemplary coding for the upper and lower 16-bit patterns and the address ranges each group falls into in the 512 entry decode lookup table. Note that some positions in each table are unused so the full 512 entries are not used for this particular encoding scheme. The advantage of this form of encoding is that it allows adder-free access to the table. In this table the tag and ROM index bits are the actual bits stored in compressed program memory. These bits are translated into the 9-bit decode lookup table address shown in the table. The bit positions shown in the table using the letter "n" are the actual bits that are stored in the compressed program memory (The RX bits).

TABLE 2

512 Entry Index Table Bucketing/Address Generation

| High Tag THX | High ROM Index Bits RHX | High Decode Lookup Table Address | High Decode Table Bucket Position | Low Tag Thx | Low ROM Index Bits RHX | Low Decode Loopup Table Address | Low Decode Table Bucket Position |
|---|---|---|---|---|---|---|---|
| 0   0 | 3 | 0 0 0 0 0 1 n n n | 8–15 | 0   0 | 0 | 0 0 0 0 0 0 0 0 1 | 1 |
| 0   1 | 5 | 0 0 0 1 n n n n n | 32–63 | 0   1 | 4 | 0 0 0 0 1 n n n n | 16–31 |
| 1 0 0 | 6 | 0 0 1 n n n n n n | 64–127 | 1 0 0 | 5 | 0 0 0 1 n n n n n | 32–63 |
| 1 0 1 | 7 | 0 1 n n n n n n n | 128–255 | 1 0 1 | 7 | 0 1 n n n n n n n | 128–255 |

TABLE 2-continued

512 Entry Index Table Bucketing/Address Generation

| High Tag THX | High ROM Index Bits RHX | High Decode Lookup Table Address | High Decode Table Bucket Position | Low Tag Thx | Low ROM Index Bits RHX | Low Decode Loopup Table Address | Low Decode Table Bucket Position |
|---|---|---|---|---|---|---|---|
| 1 1 0 | 8 | 1 n n n n n n n n | 256–511 | 1 1 0 | 8 | 1 n n n n n n n n | 256–511 |
| 1 1 1 | 16 | Literal | | 1 1 1 | 16 | Literal | |

2.4.2 Compressed Instruction Format

Figure 10:
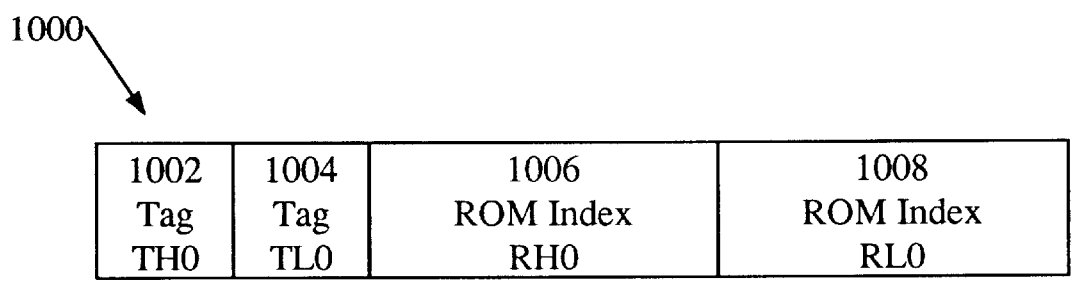
FIG. 10 is an exemplary format of a compressed program instruction 1000.
Figure 11:
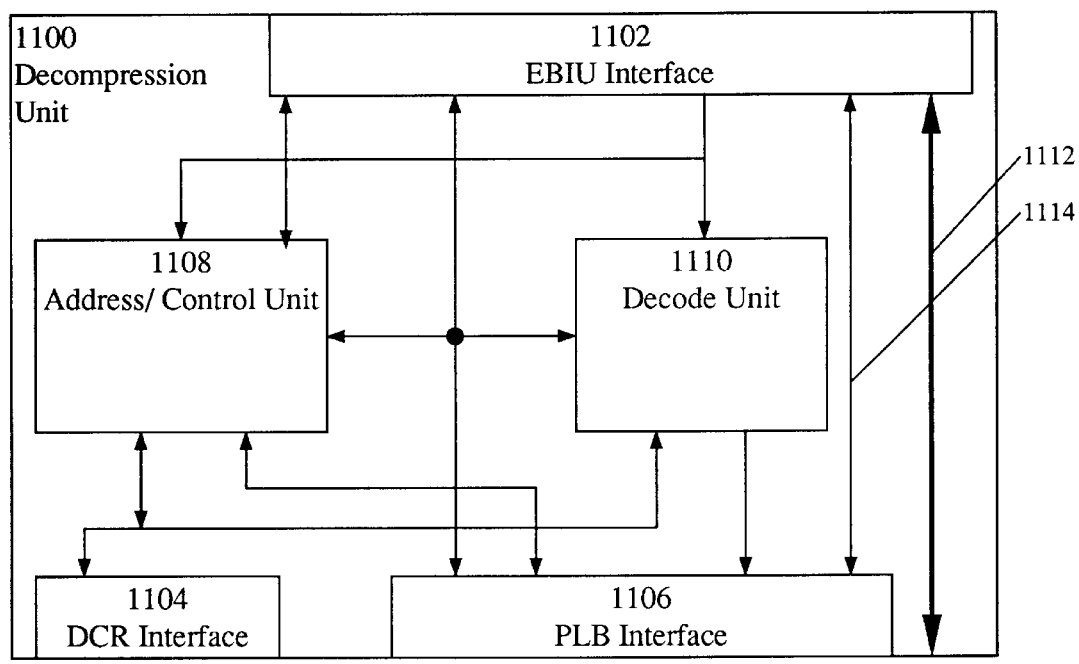
FIG. 11 shows the decompression unit.
Figure 12:
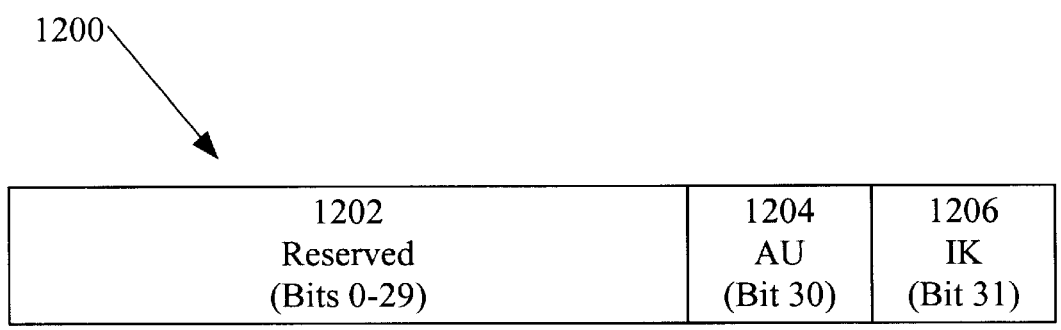
FIG. 12 shows the format for AU and IK.
Figure 13:
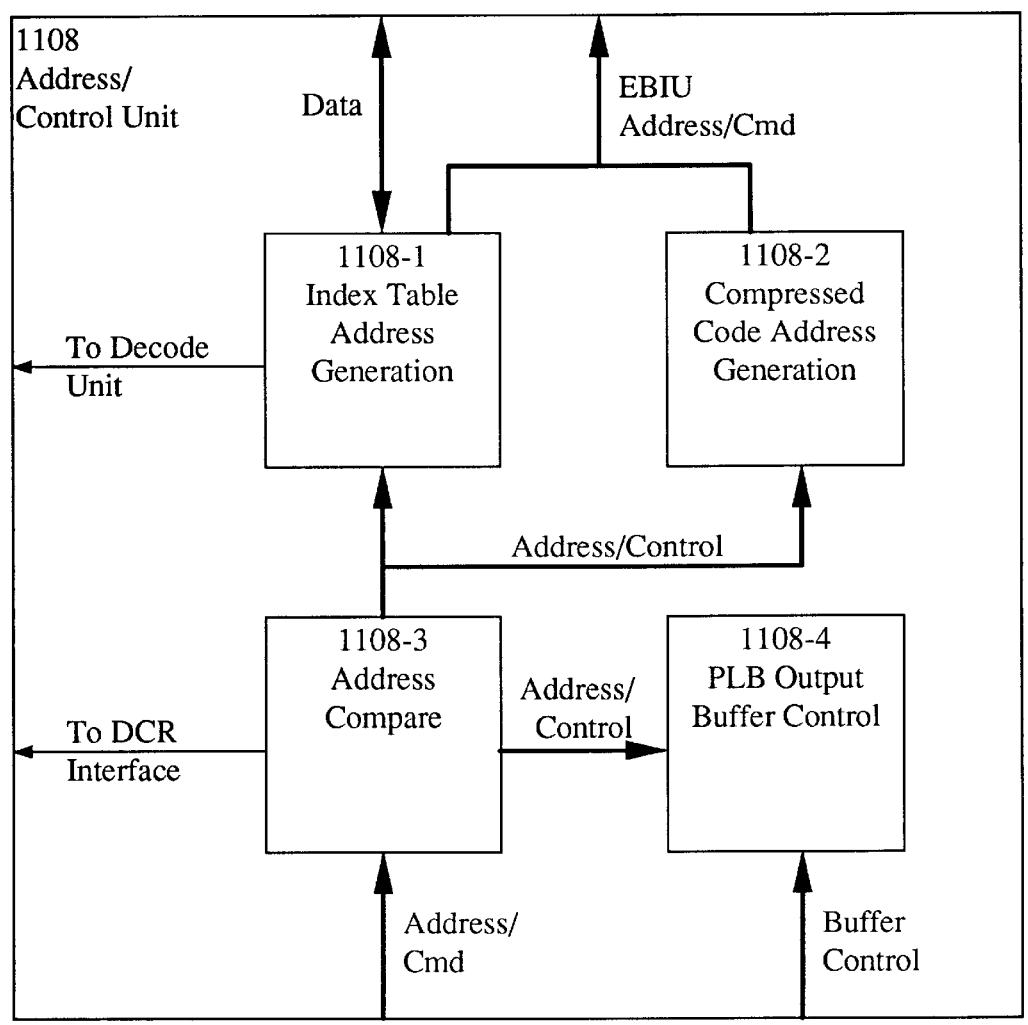
FIG. 13 shows the address/control unit.
Figure 14:
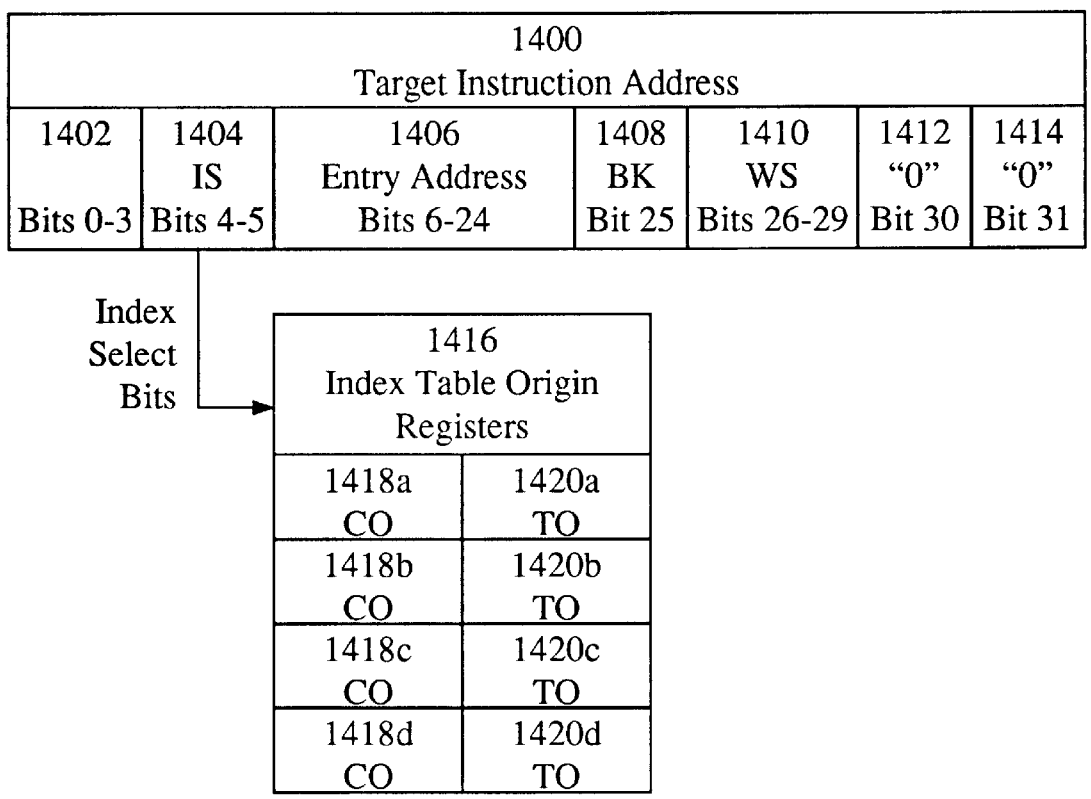
FIG. 14 shows the target instruction address and the index table origin registers.
Figure 15:
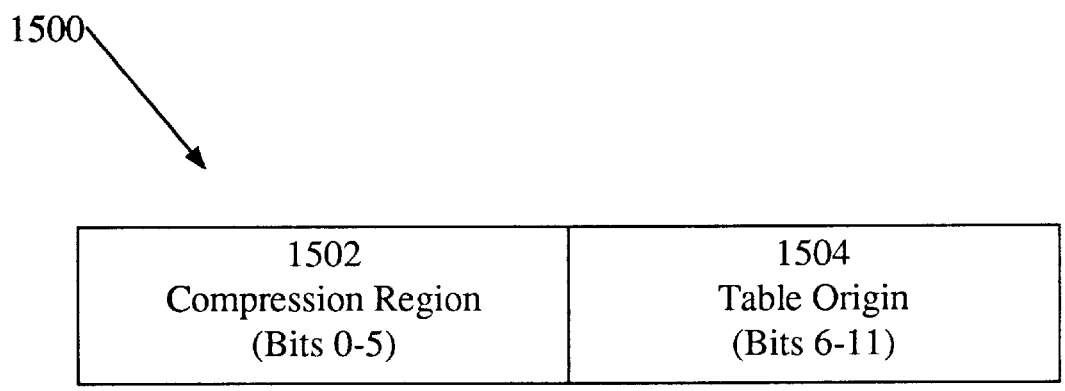
FIG. 15 shows the format for the compression region and the table origin.
Figure 16:
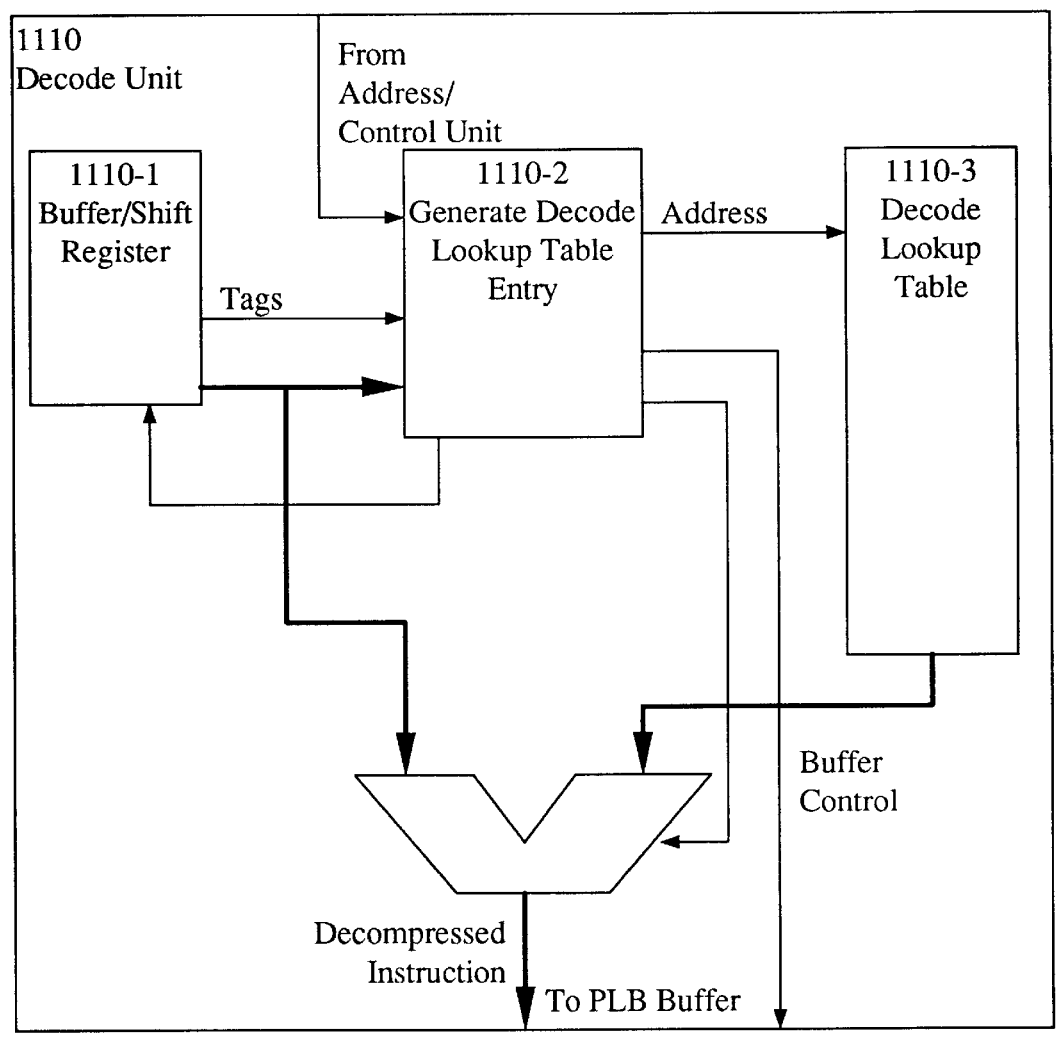
FIG. 16 shows the shows the decode unit.
Figure 17A:
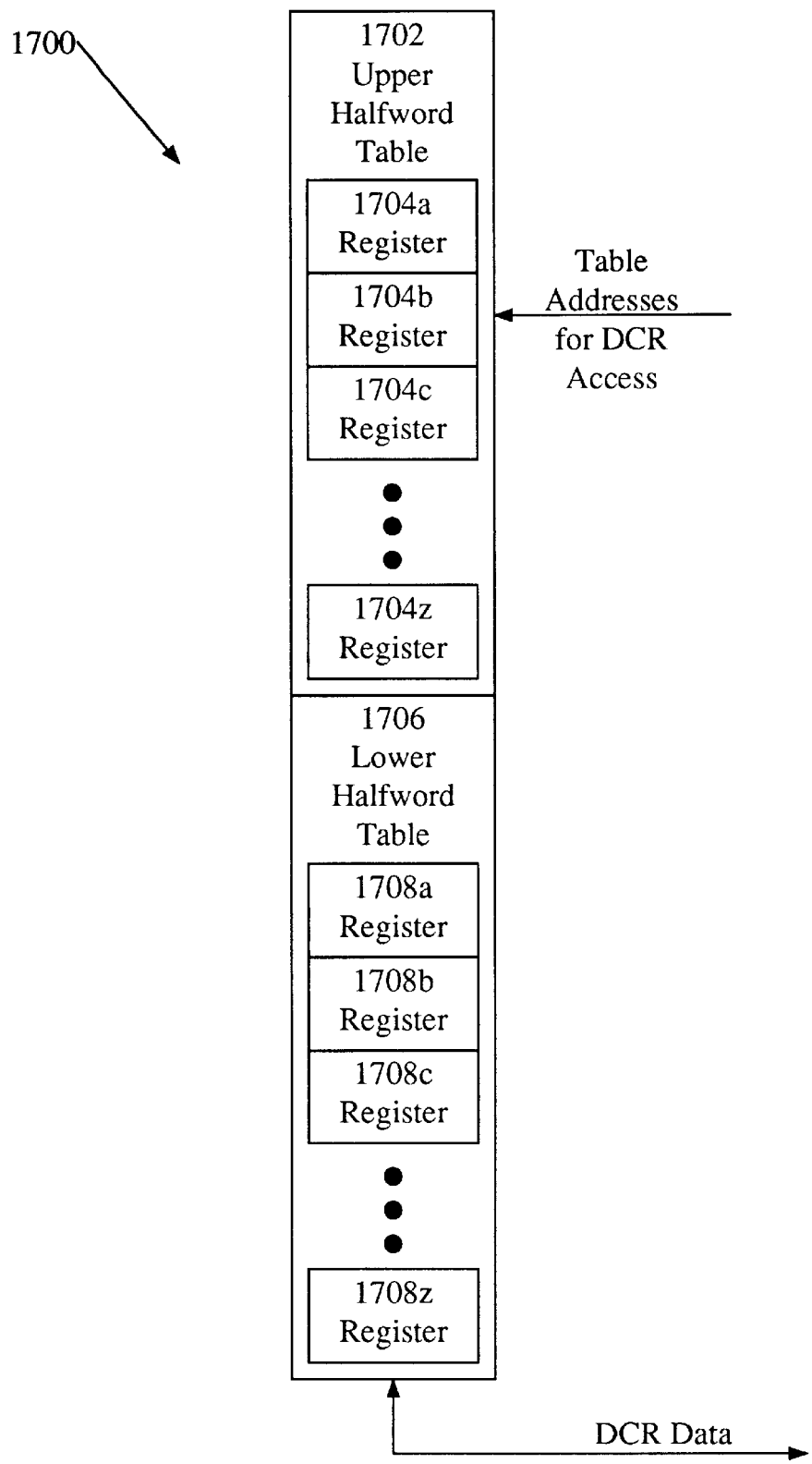
FIGS. 17A and 17B show the upper halfword table and the lower halfword table.
Figure 17B:
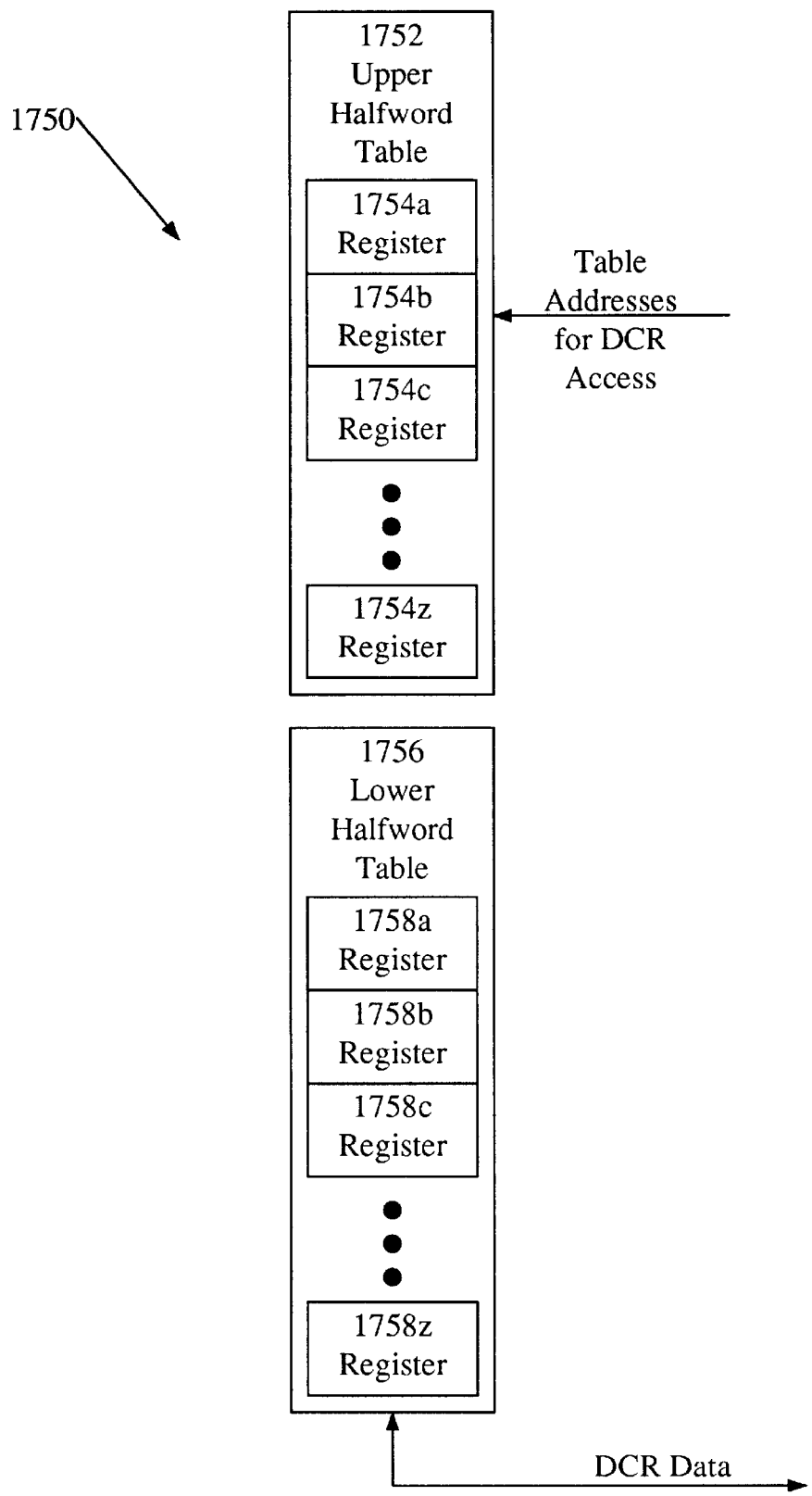

Compressed instructions are stored in memory using the format shown in FIG. 10. Each entry includes a high tag 1002, a low tag 1004, a high ROM index 1006 and a low ROM index 1008. The combination of the two Tags and two ROM Indexes will decode into a full PowerPC instruction (32 bits). The compressed form of the 32-bit instruction may vary in size from 7 to 38 bits.

2.5 Decompressed Buffer Access

The output of the decode lookup table or the 16-bit literal is placed in an output buffer and reunited with the other half of the 32-bit instruction. Once the word that was originally requested by the CPU has been decoded and placed in the output buffer, the CPU read request may be completed. The decompressor continues to request compressed instructions from the EBIU until the entire 64-byte buffer has been filled or a request to fetch a compressed instruction outside of the current compression block has been received.

In the case where the CPU is executing code sequentially the output buffer acts as a prefetch buffer for the CPU. If the CPU executes a jump instruction to a different compressed block, the decompressor will abort any burst transfers from the EBIU which may be in progress and begin a new transaction with the new address.

Note: The decompressor design does not preclude compression of data. Data is generally more random in nature and does not lend itself well to the compression algorithm implemented in the decompression unit.

The decompression unit will only service line fill and single word read cycles from compressed memory space. PLB burst requests from compressed memory space will not be supported. (The decompression unit however, will generate burst requests from the EBIU to transfer compression blocks into the decoder).

2.6 Transparent Access to Uncompressed Memory

It is desired that when the CPU requests instructions or data from an uncompressed memory space that the decompressor will appear to be transparent in the system and that no additional latency cycles are added due to its existence. The decompression unit is implemented such that it provides a pass through path for just such accesses. There will however be cases where no added latency will not be possible such as when the CPU requests data while the decompressor is in the middle of bursting instructions from the EBIU in order to fill the decompression buffers.

3.0 Glossary

| Term | Definition |
|---|---|
| EBIU | External Bus Interface Unit |
| PLB | PowerPC 4XX Local Bus |
| Compressed Memory | Memory space containing code which has been compressed by compression software. References to compressed memory space are indicated by the PLB signal PLB_Compress=1. |
| Decompressed Memory | Memory which resided in compressed memory space and has been decompressed by the decompression unit. |
| Uncompressed Memory | Memory areas which have never been compressed and therefore pass through the decompressor unit unaltered. |
| Decompressed Address Space | Address on the PLB with PLB_Compress=1. This address is within a region marked as compressed, so it is translated to locate the actual compressed address where the corresponding compressed image resides. |
| Uncompressed Address Space | Address on the PLB with PLB_Compress=0. This address is passed to the EBIU unaltered. |
| Compression Region | 64MB chunk of compressed memory indexed by an index table within that 64MB region. |
| Decompression Region | A 64MB region of decompressed address space mapped into a given compression region. Multiple decompression regions may fit into a single compression region. |
| Compression Group | A group of compressed memory representing an aligned 128-byte block of decompressed memory. |
| Compression Block | A block of compressed memory representing an aligned 64-byte block of decompressed memory. Two sequential compression blocks make up a compression group. |
| Decode Lookup Table | A table internal to the decompression unit which contains the unencoded PowerPC instruction halves. |
| "K" bit | a bit located in the CPU unit's TLB or SKR which indicates that the currently accessed page or region is compressed. This is supplied as the PLB_Compress signal on the PLB. |
| Target Instruction Address | The instruction address from the application's point of view. An "Uncompressed or Decompressed Address". |
| ITOR | Index Table Origin Register - One of 4 registers internal to the decompression unit which contains the starting location (on a 2MB boundary) of an index table within a compression region. |
| Index Table | A table, up to 2MB in size, within a compression region which is used to map a target instruction address to it's corresponding address within the compression region. |

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A data processing system comprising:

a processor for executing program instructions, having an address output for issuing addresses to first address locations and an instruction input for receiving uncompressed program instructions;

a memory having an address input and an output, storing variably sized blocks of compressed program instructions which have been formed from fixed size blocks of uncompressed program instructions, the variably sized blocks of compressed program instructions being stored at second address locations in the memory;

an index table coupled to the address output of the processor and coupled to the address input of the memory, having a map for causing a translation of the first address location addresses received from the processor, into the second address location addresses output to the memory;

a decode table having an input coupled to the output of the memory and having an output, including a map for decoding the variably sized blocks of compressed program instructions received from the memory, into the fixed size blocks of uncompressed program instructions; and an instruction buffer having an input coupled to the decode table and an output coupled to the instruction input of the processor, the instruction buffer receiving the fixed size blocks of uncompressed program instructions from the decode table;

whereby instructions already present in the instruction buffer can be passed to the processor with a shorter delay from the time of request by the processor than other instructions that must be fetched from the memory as part of a block of compressed program instructions.

2. The data processing system of claim 1, wherein the memory further stores a plurality of uncompressed program instructions, the system further comprising:

means coupled to the processor and to the memory to determine whether the output from the memory is a compressed program instruction and to if it is, then causing the decompression thereof.

3. A method in a data processing system comprising:

issuing addresses from a processor to first address locations;

storing variably sized blocks of compressed program instructions in a memory, which have been formed from fixed size blocks of uncompressed program instructions, the variably sized blocks of compressed program instructions being stored at second address locations in the memory;

causing a translation of the first address location addresses received from the processor, into the second address location addresses output to the memory;

decoding the variably sized blocks of compressed program instructions received from the memory, into the fixed size blocks of uncompressed program instructions; and receiving the fixed size blocks of uncompressed program instructions in an instruction buffer from the decode table;

whereby instructions already present in the instruction buffer can be passed to the processor with a shorter delay from the time of request by the processor than other instructions that must be fetched from the memory as part of a block of compressed program instructions.

4. The method of claim 3, wherein the memory further stores a plurality of uncompressed program instructions, the method further comprising:

determining whether the output from the memory is a compressed program instruction and to if it is, then causing the decompression thereof.

5. A data processing system comprising:

a processor for executing program instructions, having an address output for issuing addresses to first address locations and an instruction input for receiving uncompressed program instructions;

a memory having an address input and an output, storing variably sized blocks of compressed program instructions which have been formed from fixed size blocks of uncompressed program instructions, the variably sized blocks of compressed program instructions being stored at second address locations in the memory; and a decompression unit coupled to the processor and the memory which translates the processor first addresses into appropriate second addresses for the memory and subsequently decompresses the data from the memory before sending it on to the processor.

* * * * *